US008935305B2

(12) United States Patent
Novak et al.

(10) Patent No.: US 8,935,305 B2
(45) Date of Patent: Jan. 13, 2015

(54) SEQUENTIAL SEMANTIC REPRESENTATIONS FOR MEDIA CURATION

(71) Applicant: General Instrument Corporation, Horsham, PA (US)

(72) Inventors: Ashley B. Novak, Chicago, IL (US); Dragan M. Boscovic, South Barrington, IL (US); Paul C. Davis, Arlington Heights, IL (US); Faisal Ishtiaq, Chicago, IL (US); Hiren M. Mandalia, Elk Grove Village, IL (US); Alfonso Martinez Smith, Algonquin, IL (US); Faramak Vakil, Long Grove, IL (US); Narayanan Venkitaraman, Palatine, IL (US)

(73) Assignee: General Instrument Corporation, Horsham, PA (US)

( * ) Notice: Subject to any disclaimer, the term of this patent is extended or adjusted under 35 U.S.C. 154(b) by 210 days.

(21) Appl. No.: 13/723,167

(22) Filed: Dec. 20, 2012

(65) Prior Publication Data
US 2014/0181160 A1    Jun. 26, 2014

(51) Int. Cl.
G06F 17/30    (2006.01)

(52) U.S. Cl.
CPC .............................. *G06F 17/30227* (2013.01)
USPC ........................................ 707/822; 707/825

(58) Field of Classification Search
CPC .......... G06F 17/3005; G06F 17/30837; G06F 17/3084; G06F 17/30227; G06F 17/30858
USPC ........................................................ 707/825
See application file for complete search history.

(56) References Cited

U.S. PATENT DOCUMENTS

| 6,311,194 | B1 | 10/2001 | Sheth et al. |
| 6,988,093 | B2 | 1/2006 | Pic et al. |
| 7,818,329 | B2 * | 10/2010 | Campbell et al. ............. 707/755 |
| 7,870,489 | B2 | 1/2011 | Serita et al. |
| 8,090,727 | B2 | 1/2012 | Lachtarnik et al. |
| 8,145,648 | B2 | 3/2012 | Kunjithapatham et al. |
| 2004/0205648 | A1 | 10/2004 | Tinsley et al. |
| 2005/0188408 | A1 | 8/2005 | Wallis et al. |
| 2008/0036917 | A1 | 2/2008 | Pascarella et al. |
| 2010/0017819 | A1 * | 1/2010 | Gerbrandt et al. ............. 725/34 |
| 2010/0125483 | A1 | 5/2010 | Davis et al. |
| 2010/0125543 | A1 | 5/2010 | Thompson et al. |
| 2010/0281025 | A1 | 11/2010 | Tsatsou et al. |
| 2010/0318542 | A1 | 12/2010 | Davis |

(Continued)

OTHER PUBLICATIONS

Causmanns, Jorg, "A Bottom-Up Approach to Multimedia Teachware", Free University of Berlin, Center for Digital Systems, ITS '98, LNCS 1452, 1998.

(Continued)

*Primary Examiner* — Rehana Perveen
*Assistant Examiner* — Robert F May
(74) *Attorney, Agent, or Firm* — Stewart M. Wiener

(57) ABSTRACT

Generating a sequential semantic representation and a resulting content item sequence or presentation is disclosed. A set of nodes and paths among the nodes are determined. Each node includes a corresponding a set of criteria. The paths define a relationship among the plurality of nodes. Transitional operators that define additional criteria for the nodes, are associated with the paths. Content items that include characteristics that are determined to match the corresponding set of criteria for at least one of the nodes are retrieved.

20 Claims, 10 Drawing Sheets

(56) References Cited

U.S. PATENT DOCUMENTS

| | | | |
|---|---|---|---|
| 2011/0179084 | A1 | 7/2011 | Waddington et al. |
| 2011/0249953 | A1* | 10/2011 | Suri et al. ............. 386/239 |
| 2012/0041959 | A1 | 2/2012 | Weissman et al. |
| 2013/0132442 | A1 | 5/2013 | Tsatsou et al. |
| 2013/0179467 | A1 | 7/2013 | Ain |
| 2013/0232145 | A1 | 9/2013 | Weissman et al. |
| 2014/0089967 | A1 | 3/2014 | Mandalia et al. |
| 2014/0095608 | A1 | 4/2014 | Mandalia et al. |
| 2014/0161322 | A1 | 6/2014 | Cheng et al. |
| 2014/0173075 | A1 | 6/2014 | Liu et al. |
| 2014/0176604 | A1 | 6/2014 | Venkitaraman et al. |
| 2014/0200906 | A1 | 7/2014 | Bentley et al. |

OTHER PUBLICATIONS

Benitez, Ana B., et al., "Object-based Multimedia Content Description Schemes and Applications for MPEG-7", Elsevier: Signal Processing Image Communication, Elsevier Science B.V., 2000.

Kaiser, Rene et al., "Metadata-based Adaptive Assembling of Video Clips on the Web", Institute of Information Systems & Information Management, Semantic Media Adaptation and Personalization, Second International Workshop, Dec. 2007.

Nack, Frank-Michael, "Auteur: The Application of Video Semantics and Theme Representation for Automated Film Editing", Aug. 1996.

Manola, Frank et al., "RDF Primer", World Wide Web Consortium, W3C Recommendation, Feb. 2004.

Sack, Warren et al., "IDIC: Assembling Video Sequences from Story Plans and Content Annotations", MIT Media Lab, Proceedings of the IEEE International Conference on Multimedia Computing and Systems, May 1994.

Oinonen, Katri, et al., "Designing a Story Database for Use in Automatic Story Generation", Entertainment Computing—ICEC 2006, Lecture Notes in Computer Science vol. 4161, 2006, pp. 298-301.

Liu, Hugo, et al., "Makebelieve: Using Commonsense Knowledge to Generate Stories", MIT Media Laboratory, American Association for Artificial Intelligence, AAAI-02 Proceedings, 2002.

Lassila, Ora, et al., "Resource Description Framework (RDF) Model and Syntax Specification", World Wide Web Consortium, W3C Working Draft: WD-rdf-syntax-19981008, Oct. 1998.

Wood, David, "What's New in RDF 1.1", World Wide Web Consortium, W3C Working Group Note, Feb. 2014.

Wikipedia Contributors, "Vladimir Propp," at Wikipedia, The Free Encyclopedia. Dated Nov. 16, 2012. Available at: http://en.wikipedia.org/w/index.php?title=Vladimir_Propp&oldid=523314544. Accessed Sep. 5, 2014.

* cited by examiner

SEQUENTIAL SEMANTIC REPRESENTATIONS FOR MEDIA CURATION

BACKGROUND

Curation of content generally refers to the process of collecting and maintaining long term repositories of assets for current and future reference by researchers, scientists, historians, scholars, and others. Curators of repositories of electronically stored assets face many challenges with respect to organizing and presenting electronically stored assets due not only to the immense size of some collections, but also the accelerating rate at which new assets are added and edited.

There are various systems and methods for acquiring, storing, and categorizing collections of electronically stored content. Some systems create and store metadata associated with the items in the collection that describe or relate to the content of the item. For example, some systems are specifically configured for electronically storing and organizing audiovisual data, such as videos, music, pictures, etc. Such audiovisual data, and other types of media data, can generically be referred to as content items. Content items can refer to any type of representation or expression of original, derived, and/or composite creation or collection of data and/or content. Content items can be stored in various electronic file formats in a variety of computer readable media.

Electronic media storage and retrieval systems often rely on the metadata associated with each content item for organization and search functions. The metadata for each content item usually includes a listing of keywords and descriptions about the actual contents of the content item. Such metadata can be created by the creator of the content item and/or added or edited by another system or user in various manual and automatic processes for describing the content of a content item. Conventional systems use integrated and external search engines to search and/or query the metadata associated with an electronically stored collection of content items to return one or more matches. Such systems may be helpful for smaller collections of content items, but can include various drawbacks for large collections of content items. For example, users are often presented with an overwhelming set of search results when only a few keywords are used in the search.

To address such issues, some conventional systems include the use of topical keyword lists and other structured knowledge data sources that can be topic oriented and help focus the scope of the returned content items. However, the results of a search or query issued to conventional content item repository that uses topical keyword lists and/or other structured knowledge data sources can still return an overwhelming number of content items. Accordingly, organizing and relating such large numbers of returned content items can be an arduous manual process.

DETAILED DESCRIPTION

Figure 1:
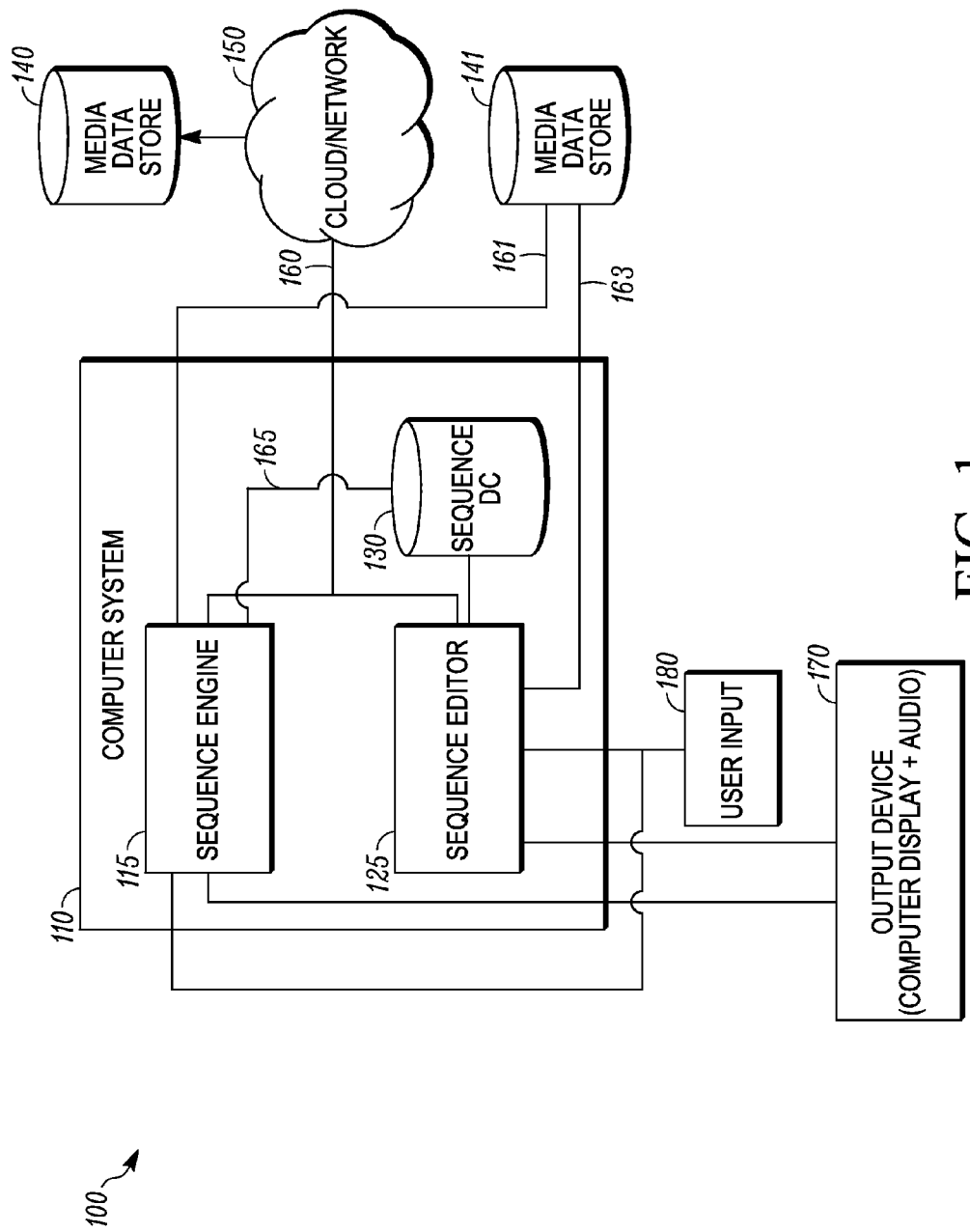
FIG. 1 is a block diagram of a system for generating sequential semantic representations and content item sequences based on the sequential semantic representations according to one embodiment.

Described herein are techniques for systems and methods for searching, selecting, and organizing collections of content items using related and ordered semantic sequential representations (SSR) for defining, representing, and creating curated presentations of content. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Various embodiments of the present disclosure include a method, performed by a computer system, for generating or defining a sequential semantic representation and a resulting content item sequence or presentation. Such methods can include determining a set of nodes, wherein each of the nodes include a corresponding set of criteria, and determining a plurality of paths among the nodes. The paths can define a relationship among the plurality of nodes. Such methods can also include determining a transitional operator associated with a path connecting a first node and a second node in the plurality of nodes. The transitional operator can define an additional criterion for the first node and the second node. The method can also include retrieving content items that include characteristics that are determined to match the corresponding set of criteria of at least one of the nodes, wherein a first content item in the plurality of content items for the first node and a second content item for the second node are retrieved based on the first content item having a first characteristic and the second content item having a second characteristic that satisfy the additional criterion of the transitional operator.

Other embodiments of the present disclosure include non-transitory computer-readable storage medium containing instructions that, when executed, control a processor of a computer system to be configured for determining a number of nodes, wherein each of the nodes can include a corresponding set of criteria, determining a number of paths among the nodes, wherein the plurality of paths define a relationship among the plurality of nodes. Such embodiments can also include instructions that also cause the processor to be configured for determining a transitional operator associated with one of the paths connecting a first node and a second node, wherein the transitional operator defines an additional criterion for the first node and the second node, and retrieving a plurality of content items that include characteristics that are determined to match the corresponding set of criteria for at least one of the nodes. A first content item for the first node and a second content item for the second node are retrieved based on the first content item having a first characteristic and the second content item having a second characteristic that satisfy the additional criterion of the transitional operator.

Yet other embodiments of the present disclosure include an apparatus having one or more computer processors, and a non-transitory computer-readable storage medium containing instructions, that when executed, control the one or more computer processors to be configured for determining multiple nodes, where each of the nodes includes a corresponding set of criteria, and determining pairwise paths among the plurality of nodes, wherein the plurality of paths define a relationship among the plurality of nodes. The instructions can further control the processors to be configured for determining a transitional operator associated with one of the paths connecting a first node and a second node, wherein the transitional operator defines an additional criterion for the first node and the second node, and retrieving a plurality of content items that include characteristics that are determined to match the corresponding set of criteria for at least one of the nodes. A first content item in the plurality of content items for the first node and a second content item for the second node are retrieved based on the first content item having a first characteristic and the second content item having a second characteristic that satisfy the additional criterion of the transitional operator.

The following detailed description and accompanying drawings provide a more detailed understanding of the nature and advantages of particular embodiments.

Various embodiments of the present disclosure include systems and methods for authoring SSRs that can be used for creating or creating new perspectives or narratives based on existing media content items. SSRs are superstructures that can be used for defining and/or describing customized sequences of various types of media, such as videos and music tracks, into a presentation with a particular perspective, narrative, or storyline. In such embodiments, a sequence editor, in response to user input, can create an SSR that includes a visual representation of a graph having a number of nodes connected by pairwise edges. Each node in the sequence can be associated with a number of descriptors to define a set of weighted criteria. In some embodiments, each weighted criterion can include a tuple having an attribute name, an attribute value, and an attribute weight.

The weighted criteria of each node can be used in a matching function to match the node with one or more content items in a collection of content items with characteristics defined by metadata associated with the content item. For example, an SSR for the selection of video clips from a collection of video clips to create an edited presentation of selected video clips can include multiple nodes. A first of such nodes can define a criterion for a video clip with a 75% weight on a happy mood, where the mood is the attribute name, and happy is the attribute value. The next node, connected to first node by a path, can define a criterion for another video clip with a 100% weight on a sad mood. In some embodiments, the path that connects the first node to the next node can include a transitional operator that can impose additional or auxiliary criteria for the transition between the two nodes, e.g., a cross fade.

In other embodiments, the transitional operators associated with the path between the first node and the next node can also impose additional criteria on the nodes that it connects. For example, the transitional operator can require that the video clip matched with the first node include one characteristic that is the opposite or different than one characteristic of the video clip matched with the next node. In related embodiments, each path between the various pairings of nodes in the SSR can include a similar or different transitional operator.

In yet other embodiments, all or some of the nodes in the SSR can be subject to one or more media transformational operators which can be used to augment one or more characteristics of the content item that matches the weighted criteria of the nodes. For example, a media transformational operator can change the color scheme of a matching video clip, e.g., convert the video clip from color to black and white.

In some embodiments, the SSR can also include a set of global attributes, which can be uniformly or selectively applied to all or some of the nodes, paths, or transitional operators. For example, a global attribute can include a requirement that the total duration of each node is no longer than two minutes, transitions take no longer than 10 seconds, and that the entire resulting presentation or narrative using the matched content items is no longer than 15 minutes.

Based on such SSRs, a sequence engine can generate one or more queries to one or more media data stores. In some embodiments, generating the one or more queries can include determining a number of matching functions. The matching functions can be used to analyze the fit or match of various content items in one or more content item repositories, such as a media data store, based on metadata associated with individual content items or collections of content items.

In response to the queries, the sequence engine can receive a number of content items, such as video clips, and apply the associated media transformational operators and transitional operators to compile a custom presentation or narrative based on the criteria of the constituent nodes, paths, transitional operators, media transformational operators, and global attributes of the SSR. In some embodiments, any or all intermediate steps can be automatically performed by a computer system.

FIG. 1 is a block diagram of a system 100 for creating SSRs and generating new sequences of content according to various embodiments of the present disclosure. As shown, system 100 includes a computer system 110 coupled to a local media data store 141 via connection 163, and a remote media data store 140 via connection 160 and cloud/network 150. In such embodiments, connections 160, 161, 163 can implement various types of data and communication connections and protocols. For example, connection 160 can communicate data using an Internet protocol (IP), Ethernet, Wi-Fi, worldwide interoperability for microwave access (WiMAX), 802.11xx, and other wired and wireless communication protocols. The cloud/network 150 can include open and closed standard and proprietary networks. For example, cloud/network 150 can include the Internet. In some embodiments, media data store 140 can be disposed in a remote server computer (not shown). Similarly, media data store 141 can be disposed in computer system 110 or in a local peripheral device or other computer system local to computer system 110. In such embodiments, computer system 110 can be coupled to media data store 141 via various types of peripheral and data connections, such as universal serial bus (USB), IEEE 1394, Thunderbolt™, etc. Accordingly, computer system 110 can also include one or more network interfaces (not shown) and one or more peripheral interfaces (not shown) to facilitate communication between computer system 110 and other networked computers and peripheral devices.

In some embodiments, computer system 110 can be coupled to output device 170, such as computer display device. Computer system 110 can also include a sequence engine 115, a sequence editor 125, and a sequence data store (sequence DS) 130. In such embodiments, sequence engine 115, sequence editor 125, and sequence data store 130 can all be coupled to one another by dedicated connections, such a connection 165 coupling sequence engine 115 to sequence data store 130. In other embodiments, the sequence engine 115, sequence editor 125, and sequence data store 130 can be coupled to one another, and other components in computer system 110, through one or more common data connections, such as a data bus. Accordingly, the sequence engine 115, the sequence editor 125, and the sequence data store 130 can all be implemented in various combinations of hardware, firmware, and software.

In some embodiments, sequence editor 125 can generate a sequence editor tool graphical user interface (GUI) on an output device 170. In some embodiments, the sequence editor tool can include a number of rendered and/or customizable controls that the user can operate and manipulate using a user input device 180. User input device 180 can include various types of peripheral user input devices, such as a keyboard, a mouse, a tablet, a stylus, a drawing tablet, a touchscreen, etc. In related embodiments, the user input device 180 can include programmable or specialized inputs for interacting with the sequence editor 125, e.g., programmable keys or buttons on a keyboard for executing various types of predetermined sequences of commands or macros.

In some embodiments sequence editor 125, in response to user input, can access sequence data store 130 to retrieve a template SSR or a previously stored SSR. The sequence editor 125 can then display a visual representation of the template SSR with a previously stored SSR an output device 170. In such embodiments, the visual representation of the template or previously stored SSR can include various combinations of shapes, graphics, and text along with visual representations and user operable controls and tools to interact with, manipulate, change, or edit the visual representation of the template or previously stored SSR.

The sequence editor 125, in response to user input, can define a number of nodes. Each node of the SSR can include one or more descriptors or criteria that represent specifications or numerics for matching one or more content items to that particular node. Such descriptors and criteria can include tuples including, but not limited to, an attribute name, an attribute value, and associated attribute weighting value. As used herein, descriptors or criteria of nodes in an SSR can refer to a listing of one or more characteristics that can include alphanumeric, hexadecimal, and binary multidimensional data structures for describing, specifying, and weighting values and codes when matching corresponding metadata of a target collection of content items in a media data store. Accordingly, sequence editor 125 can access a targeted media data store to retrieve a look up table, a primer, or other listing of the structure and type metadata associated with the content items in the media data store. In such embodiments, using the look up tables, primers, or other listings of the structure and type metadata associated provides the sequence editor 125 and the sequence engine 115 to match potentially mismatched vocabularies and codes in the descriptors or criteria of nodes in an SSR and the metadata associated with the content items.

In other embodiments, sequence editor 125 can generate and display a graphical user interface, or other user interface, that, in response to user input, can generate a new SSR. In such embodiments, the sequence editor 125 can present a user with tools for laying out the visual representation of and defining the various attributes of a new SSR. In such embodiments, the sequence editor 125 can access a look up table regarding the structure and type of metadata of the targeted media data store to generate one or more tools or menu items to guide a user in selecting appropriate and/or available metadata descriptors when defining criteria for nodes in the SSRs. In related embodiments, the sequence editor 125 can translate between the structure and type of metadata of the targeted media data store and a common vocabulary for describing various types of metadata. For example, for ease-of-use, sequence editor 125 can consistently provide the user with a native vocabulary for moods, e.g., happy, sad, depressing, exciting, etc., that can be mapped to a corresponding vocabulary for moods in the metadata of the targeted media data store, e.g., cheerful, upset, melancholy, elated, etc. In such embodiments, the sequence editor 125 can simplify the use of different media data stores having different native structures and types of metadata.

When sequence editor 125 has, in response to user input, specified a partial or complete SSR, the sequence editor 125 can store the resulting SSR in sequence data store 130. In related embodiments, the resulting SSR can include results of editing a template or previously stored SSR or a newly created SSR in the sequence data store 130. With one or more SSRs stored in the sequence data store 130 or other storage device, various embodiments of the present disclosure are directed towards generating a new presentation or narrative using content items with metadata that match the descriptors on the nodes, paths, transitional operators, media transformation operators, and global attributes of the SSR.

The sequence engine 115 can access the sequence editor 125 and the sequence data store 130. In such embodiments, the sequence engine 115 can retrieve one or more previously created or stored SSRs, and in accordance therewith, generate one or more queries to send to local media data store 141 or remote media data store 140. Generating the queries can include translating descriptors from a local vocabulary or data set to descriptors native to the structure and type of metadata associated with the targeted media data stores.

In response to such queries, the sequence engine 115 can receive one or more content items from one or more media data stores 140 or 141. Each received content item can be associated with one or more nodes of the SSR on which the queries were based. In such embodiments, each received content item will have been determined by the media data store or the sequence engine 115 to match, the criteria of the nodes and other criteria of the SSR within some range of acceptability or some degree of confidence. Accordingly, the received content items can include content items that partially match the criteria of the SSR.

The sequence engine 115 can then perform one or more matching functions to automatically match one or more of the potentially acceptable content items to each node of the SSR. In related embodiments, the sequence engine 115 can generate an output on output device 170, such as in a message or menu item in a graphical user interface, to present a user with some or all of the received content items that may or may not be acceptable for each node of the SSR. In related embodiments, the sequence engine 115 can also generate a user interface or control, or invoke the sequence editor 125, to present the user with the ability to adjust or optimize the weighted criteria associated with one or more of the nodes in the SSR. Based on the adjusted or optimized weighted criteria, the sequence engine can generate new queries to the relevant media data stores, and in response thereto, receive updated content item results. This process can be repeated until the desired results are achieved.

Figure 2:
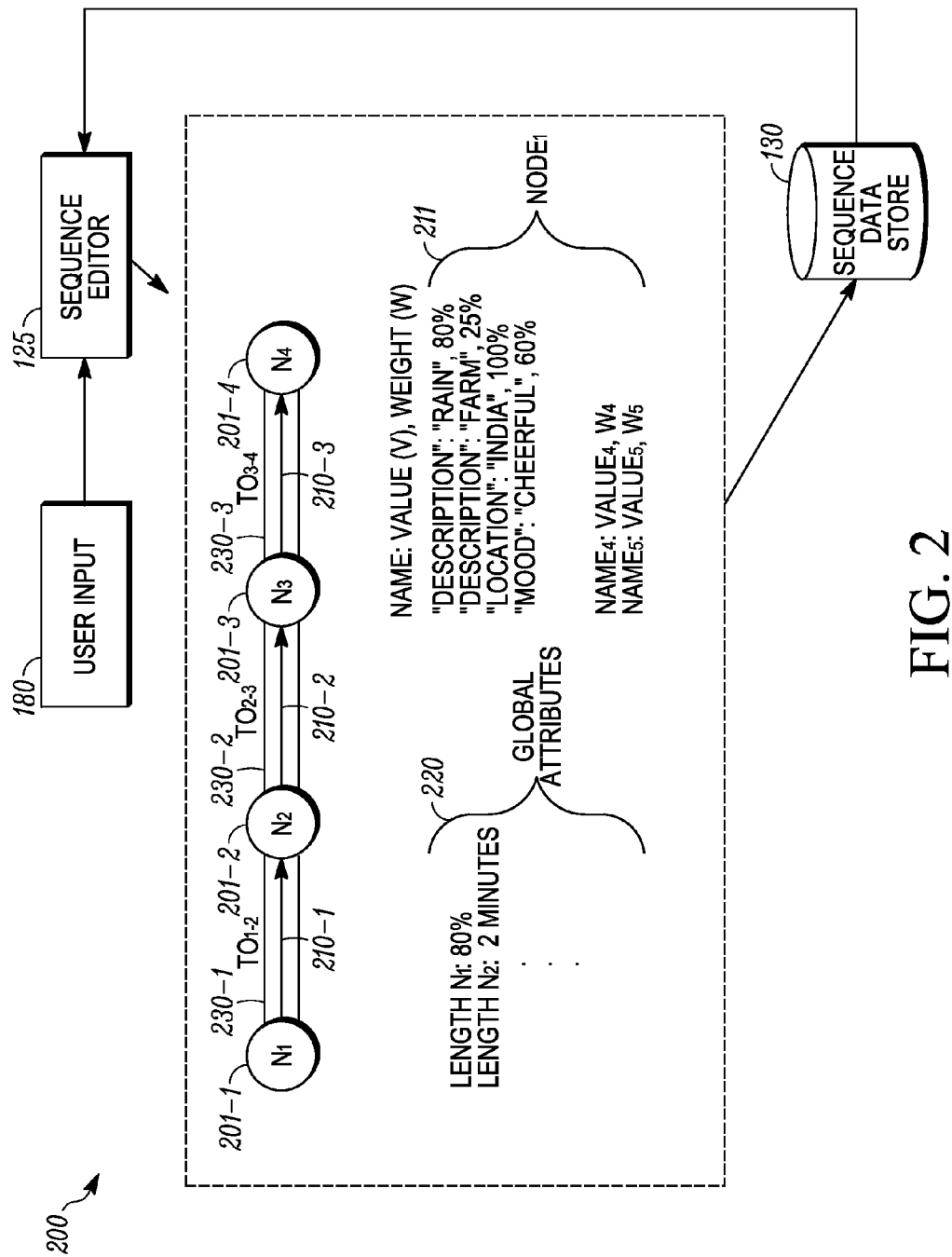
FIG. 2 is a block diagram of system for creating, editing, or storing a sequential semantic representation according to one embodiment.

FIG. 2 shows an SSR 200 according to various embodiments of the present disclosure. As shown, sequence editor 125, in response to user input received through user input device 180, can retrieve SSR 200 from sequence data store 130. The sequence editor 125 can edit the SSR 200 and store the updated or new version back to sequence data store 130.

SSR 200 can include 1 to N nodes 201, where N is a natural number. Each of the nodes 201 can be coupled to one other node via a path 210. The paths 210 connecting the nodes 201 can indicate various relationships among the nodes 201. For example, as shown, SSR 200 can include four nodes 201 connected by three paths 210 with directional arrows going from left to right the indicate the temporal order in which the content items determined to match the nodes will be compiled and ultimately displayed.

Each of nodes 201 of SSR 200 can include an associated set of criteria 211. In some embodiments, criteria 211 can include various types of descriptors and tuples corresponding to various structures and types of metadata associated with content items stored in a media data store. The format and structure of criteria 211 can be determined by the sequence editor 125, the sequence data store 130, and or the media data store reference by or associated with SSR 200. In some embodiments, criteria 211 can include a set of weighted criteria that the sequence engine or sequence data store 130 can use to match content items to each particular node 201. As shown in the example of FIG. 2, criteria 211 can be associated with node 201-1 and can include a set of tuples for specifying weighted criteria. Each such tuple can include an attribute name (Name), an attribute value (V), and an associated weighting value (W). In the example shown, the weighting value can be specified as a percentage, but other values can be used.

SSR 200 also includes a number of transitional operators 230. In some embodiments, the transitional operators 230 can be associated with a particular path 210 and/or with one or more nodes 201. In some embodiments, the transitional operators 230 can specify a media transitional effect between nodes 201.

For example, transitional operators 230 can specify a specific transition, such as a gradual cross fade or an abrupt change, between content items that match each of nodes 201. Each of the transitional operators 230 can include a similar or different transitional media effects.

In other embodiments, the transitional operators 230 can specify additional criteria regarding the relation between the content items that match the nodes 201 of the SSR 200. For example, node 201-1 on the left-hand side of the transitional operator 230-1 can be required by transitional operator 230-1 to be a video clip that ends with an argument occurring between two characters, while the node 201-2 may be required by transitional operator 230-1 to include content or characters that includes resolving a conflict. In another example, node 201-3 on the right of transitional operator 230-2 can be required to go into more detail about a particular topic than the node 201-2 to the left of transitional operator 230-2. In another example, node 201-4 on the right of transitional operator 230-3 can be required by transitional operator 230-3 to contradict some aspect of the node 201-3 to the left of transitional operator 230-3.

In related embodiments, transitional operators 230 can be used to restrict the selection of content items for adjacent nodes that can then also be used to enforce constraints on sequences of any length.

In one embodiment, SSR 200 can also include a set of global attributes 220. The global attributes can apply universally or selectively to all or some of the nodes 201, paths 210, and transitional operators 230 of SSR 200. For example, global attributes 220 can include specifications regarding the duration of each node independently and as a collection. In such embodiments, for example, node 201-1 can be restricted to including a percentage (in the depicted example, 80%) of the total length for time of the resulting sequence based on SSR 200. Similarly, for example, node 201-2 can be restricted to be a specified length (in the depicted example, two minutes in length) in the resulting sequence based on SSR 200. In other embodiments, for example, global attributes 220 can include a restriction on the total length of all nodes 201, e.g., the total length of the resulting sequence of content items. One of ordinary skill will recognize that the examples discussed here are merely illustrative and should not be construed as limiting the present disclosure in any way.

Figure 3:
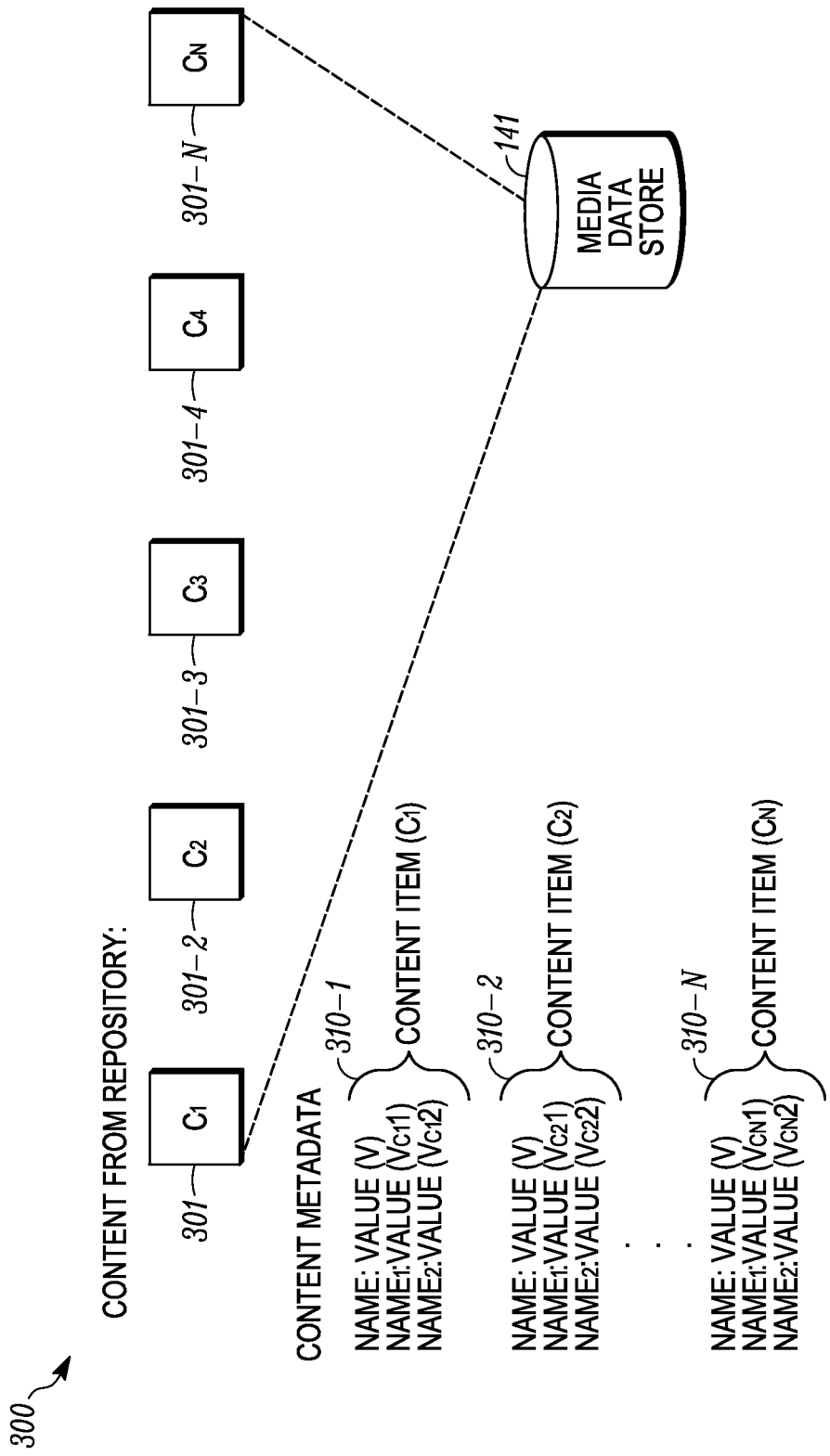
FIG. 3 is a block diagram of a content item repository according to one embodiment.

FIG. 3 shows a collection 300 of N content items 301, where N is a natural number, stored in a repository of media data store 141, according to one embodiment. The collection 300 can include various types of content items including, but not limited to, videos, video clips, pictures, sounds, music, spoken word performances, digital presentations, slideshows, presentations or narratives based on previously created and instantiated SSRs, according to various embodiments of the present disclosure, etc.

As shown, each content item 301 can include or be associated with a set of content metadata 310. Each set of content metadata 310 can include a number of descriptors or characteristics associated with the respective content item 301. The sets of content metadata 310 can be defined by a user, such as the maker of the content item or a curator. In related embodiments, the sets of content metadata can be automatically determined by a computer system implementing various software and methodology for analyzing and assigning metadata.

In some embodiments, the naming convention or namespace of the descriptors or characteristics of each set of content metadata 310 can match the naming convention or namespace of the weighted criteria of the nodes of an SSR. In other embodiments, the naming convention or namespace of the descriptors or characteristics of the sets of content metadata 310 can be different from the naming convention or namespace of the weighted criteria of the nodes of an SSR. In such embodiments, a sequence editor, sequence engine, or other processor can perform one or more translations or mappings to associate the disparate naming conventions or namespace.

As shown, each set of content metadata 310 can include multiple attribute-name attribute-value pairs. The illustrative examples provided herein should not be construed as limiting the present disclosure in any way. For example, with reference to a collection of videos or video clips, the set of content metadata 310-1 can include attribute-value pairs with an attribute named "mood" with an associated attribute value "sad," an attribute named "color" with an associated attribute value "blue," and an attribute named "actor" with an associated attribute value "Bob." Set of content metadata 310-2 can include an attribute named "mood" with an associated attribute value "happy," an attribute named "color" with an associated attribute value "red," and an attribute named "actor" with an associated attribute value "Joe." Set of content metadata 310-N can include an attribute named "mood" with an associated attribute value "melancholy," an attribute named "color" with an associated attribute value "yellow," and an attribute named "actor" with an associated attribute value "Linda." In such embodiments, the attribute named "mood" can refer a quality regarding the emotional impact of some of or all portions of the associated content item, such as a video clip. Similarly, the attribute named "color" can refer to an overall quality of the photography or cinematography with respect to color schemes. The attribute named "actor" can refer to an actor who appears in the associated video clip.

Attribute-names, such as "title", can be used more than once in a set of content metadata 310 when the associated content item includes multiples of the same type of attribute. For example, attribute name "actor," can be associated with an actor named "Bob" and an actor named "Linda." In such scenarios, the set of content metadata 310 would include multiple attribute-name attribute-value pairs having an attribute named "actor." One entry would be for Bob and one entry would be for Linda.

Figure 4:
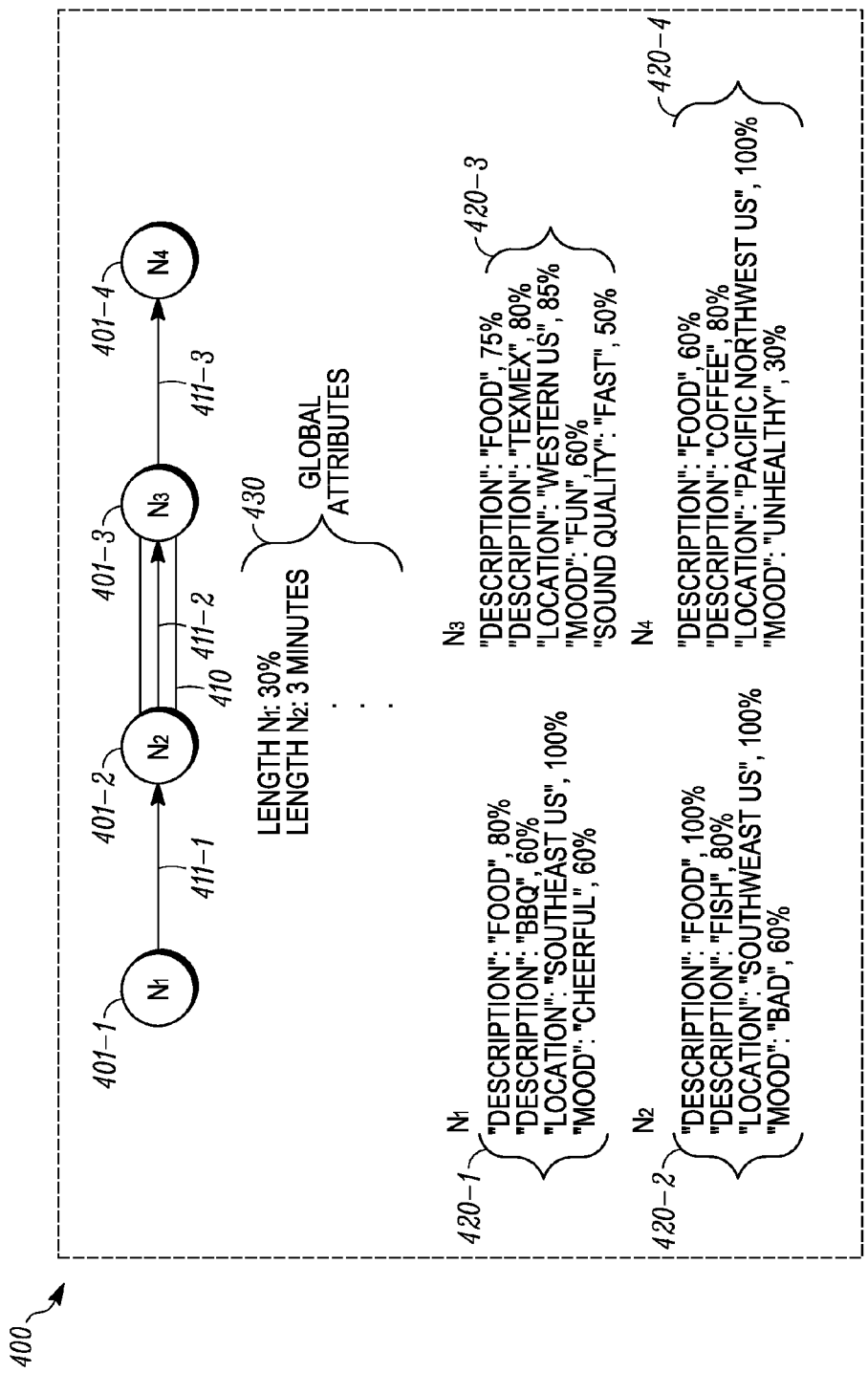
FIG. 4 is a block diagram of a sequential semantic representation according to one embodiment.

FIG. 4 shows a specific example of an SSR 400 defined to generate a sequence of video clips pertaining to a narrative regarding foods by U.S. geographical regions. SSR 400 can be defined using various embodiments of the sequence editor 125 and or the sequence engine 115. In other embodiments, SSR 400 can be stored in a sequence data store 130 and/or later retrieved and edited for later use.

As shown, SSR 400 can include four nodes 401 connected by three paths 411. Node 401-1 is connected to node 401-2 by path 411-1, node 401-2 is connected to node 401-3 by path 411-2. Path 411-2 is subject to a transitional operator 410. Node 401-3 is connected to node 401-4 by path 411-3. In the specific example, the relationship based on paths 411 defines a temporal relationship between the nodes. Specifically, the content items having sets of content metadata that match the sets of weighted criteria 420 will be arranged in sequence according to the paths 411. Accordingly, a content item, in this case a video clip, that matches node 401-1 will be shown first in the sequence. The content item that will match node 401-1 will need to include descriptors that match, to some degree of confidence, the associated weighted criteria 420-1. Next, a content item that matches the weighted criteria 420-2 associated with node 401-2 will come next in the sequence. The transition between the content item that matches node 401-1 to the content item that matches node 401-2 will be determined by the transitional operator, if any, associated with path 411-1. For example, the transitional operator associate with 411-1 can require that the transition include a timed cross fade that should take no longer than five seconds.

The next content item in the sequence defined by SSR 400 can include a still image that matches the weighted criteria 420-3 associated with node 401-3. While not shown, weighted criteria 420-3 can specifically require that the content item be a still image and match with some degree of confidence the other weighted criteria. As shown, the path 411-2 between node 401-2 and node 401-3 is subject to a transitional operator 410.

Transitional operator 410 can be defined to further restrict or constrain the selection of content items that match node 401-2 and node 401-3 to further customize the narrative or storyline effect of the sequence that results from SSR 400. For example, transitional operator 410 can require that a content item that matches node 401-2 will also need to include at least one attribute value that is different from and/or the opposite of at least one attribute of a common attribute name in a content item that matches node 401-3. For example, the transitional operator 410 can require that the attribute value for the attribute name "location" be different. Such transitional operators can be used to prevent including too much content regarding a specific location. One of ordinary skill will recognize that the examples discussed here are merely illustrative and should not be construed as limiting the present disclosure in any way. In the specific example shown in FIG. 4, node 401-2 has a set of weighted criteria 420-2 that includes the attribute-name attribute-value pair "location": "Southwest". Node 401-3 had a set of weighted criteria 423 that includes the attribute-name attribute-value pair "location": "Western U.S." It is possible that matching content items for node 401-2 and node 401-3 could be returned that both include "Arizona" in one of the sets of descriptors, because Arizona is both a Western U.S. state and is a southwestern state. Accordingly, the transitional operator 410 can be used to avoid the potential monotony of including too much information or content associated with Arizona. For example, the use of the transitional operator 410 requiring that the attribute value for the attribute name "location" be different may cause node 401-3 to return the "New Mexico" instead of "Arizona".

Finally, the final content item in the resulting sequence will need to match the weighted criteria 420-4 associated with node 401-4, path 411-3 and any applicable transitional operators.

In addition to the individual sets of weighted criteria 420, SSR 400 can also be subject to a set of global attributes 430. In the specific example shown, global attributes 430 can define the length of time or duration associated with each particular node 401. For example, a content item that matches node 401-1 is constrained to last no more than 30% of the total sequence time resulting from SSR 400. Similarly, node 401-2 is constrained to be no longer than three minutes.

Figure 5:
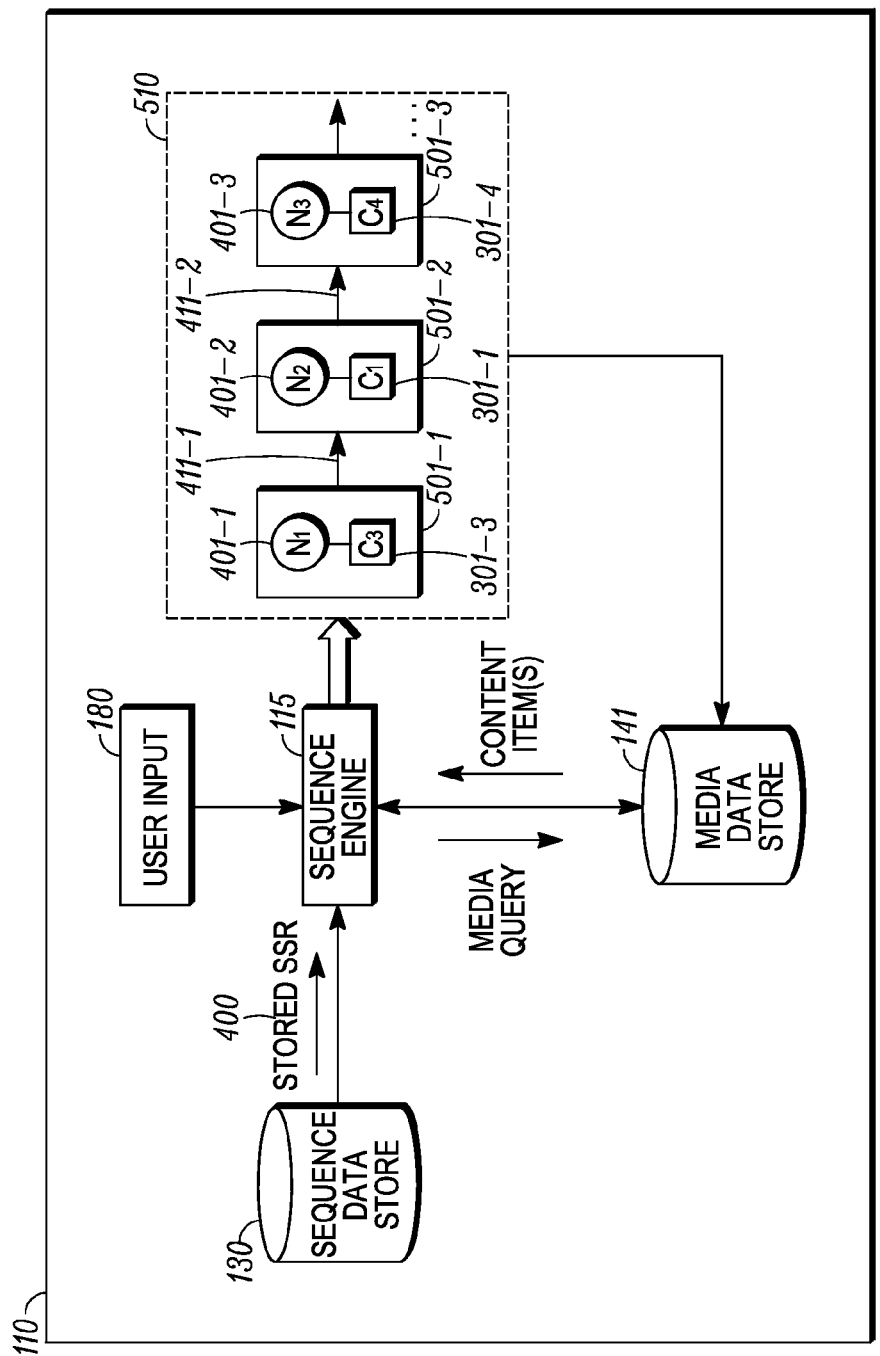
FIG. 5 is a block diagram of a system for generating a content item sequence based on a sequential semantic representation according to one embodiment.

FIG. 5 illustrates the data flow among the components of computer system 110 for generating an output sequence 510 based on example SSR 400, according to various embodiments of the present disclosure. In some embodiments, sequence engine 115, in response to user input received by user input device 180, can retrieve stored SSR 400 from sequence data store 130. Based on the SSR 400, the sequence engine 115 can create one or more media queries.

In some embodiments, the media queries can include a matching function specifically formulated for each type of metadata that is referred to in the various constituent sets of weighted criteria associated with the nodes of the SSR 400. The sequence engine 115 can then send the media queries to one or more media data stores 141. In response to the media queries, sequence engine 115 can receive multiple potentially matching content items.

In related embodiments, sequence engine 115 can analyze the content items returned in response to the media queries. Such analysis can include generating match confidence scores corresponding to individual weighted criteria of the sets of weighted values 420 associated with various nodes and transitional operators 410 of SSR 400, using matching functions. In such embodiments, the matching functions can be different for each type of weighted criterion and/or transitional operator. For example the matching function for the length of the content item can be different from the matching function use for the "mood" attributes name matching.

In various embodiments, sequence engine 115 can generate the sequence of content 510 by selecting the content items with the highest match confidence scores for each node 401. In related embodiments, sequence engine 115 can generate the sequence of content 510 by selecting the content items with the highest match confidence scores for each node 401 that also conform to any constraints imposed by global attributes 430. In yet other embodiments, the sequence engine 115 can generate the sequence of content 510 by applying any media transformational operators associated with the nodes 401 to the content items that match the nodes 401 and any applicable transitional operators.

As shown content item sequence 510 can include a number of video clips 501. In accordance with the example discussed above, content item sequence 510 can include matching nodes 401 with content items 301 from content item collection 300. Accordingly, each video clip 501 can include a content item 301 that matches a corresponding node 401. In the specific example shown, video clip 501-1 includes content item 301-3 that matches 401-1 and is constrained by global attributes 430. Video clip 501-2 includes content item 301-1 that matches node 401-2, is constrained by global attributes 430, and complies with transitional operator 410. Video clip 501-3 can include a content item 301-4 that matches node 401-3.

Figure 6:
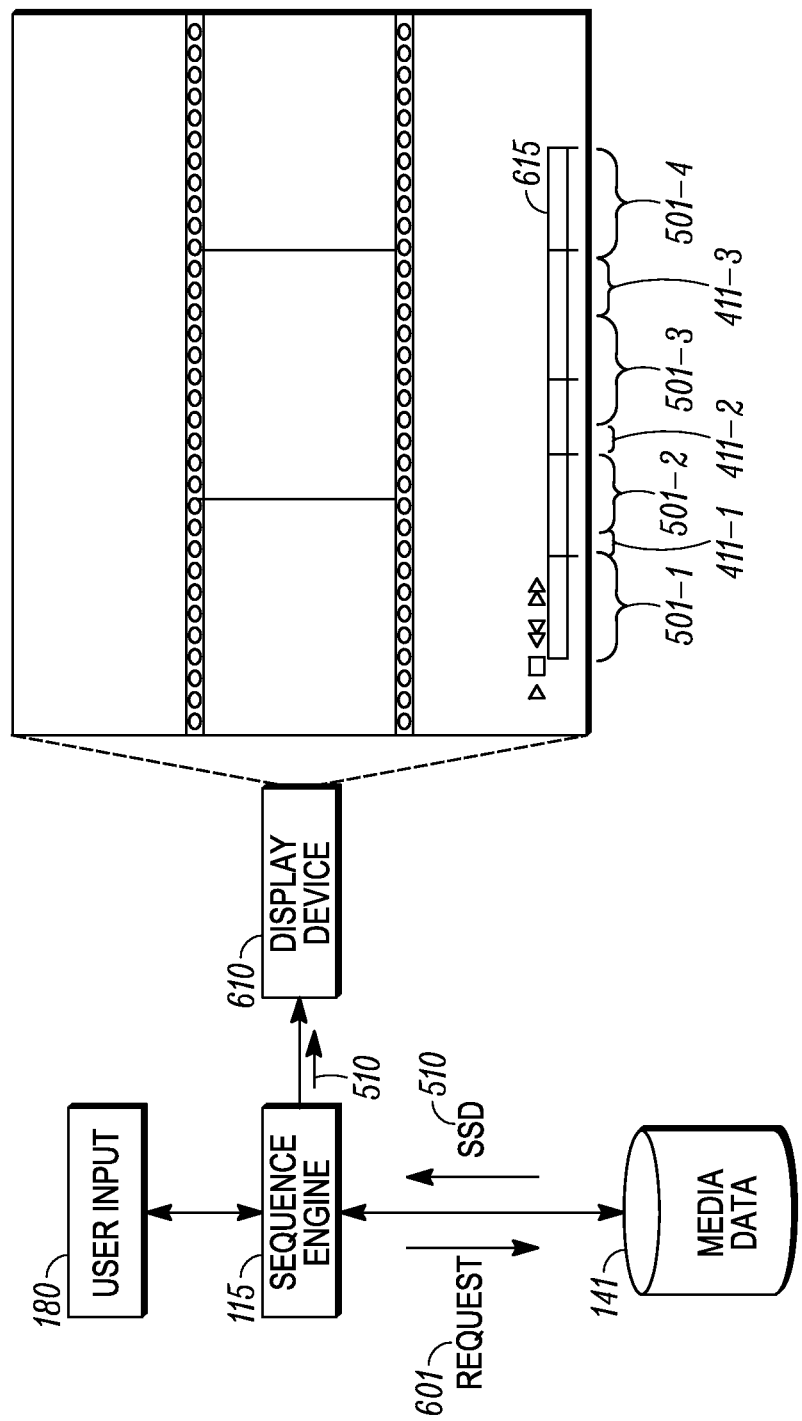
FIG. 6 is a block diagram of a system for displaying a content item sequence based on a sequential semantic representation according to one embodiment.

The resulting content item sequence 510, which in this particular example is a sequence of video clips, can be output to a display device 610, such as a computer monitor, or can be stored in media data store 141, as shown in FIG. 6. In response to user input received through user input device 180, sequence engine 115 can send a request 601 for content item sequence 510 to media data store 141. In response to the request 601, sequence engine 115 can receive electronic communication including content item sequence 510. Sequence engine 115 can send content item sequence 510 to the display device 610 for presentation to one or more users. In some embodiments, the display content item sequence 510 can include various controls and indicators 615. In the specific example shown, indicator 615 includes sequence time/position indicators that can indicate when the various content items 501 begin and end in the sequence. In related embodiments, the indicator 615 can also include visual indications of paths 410 and/or transitional operators as they occur in sequence.

Figure 7:
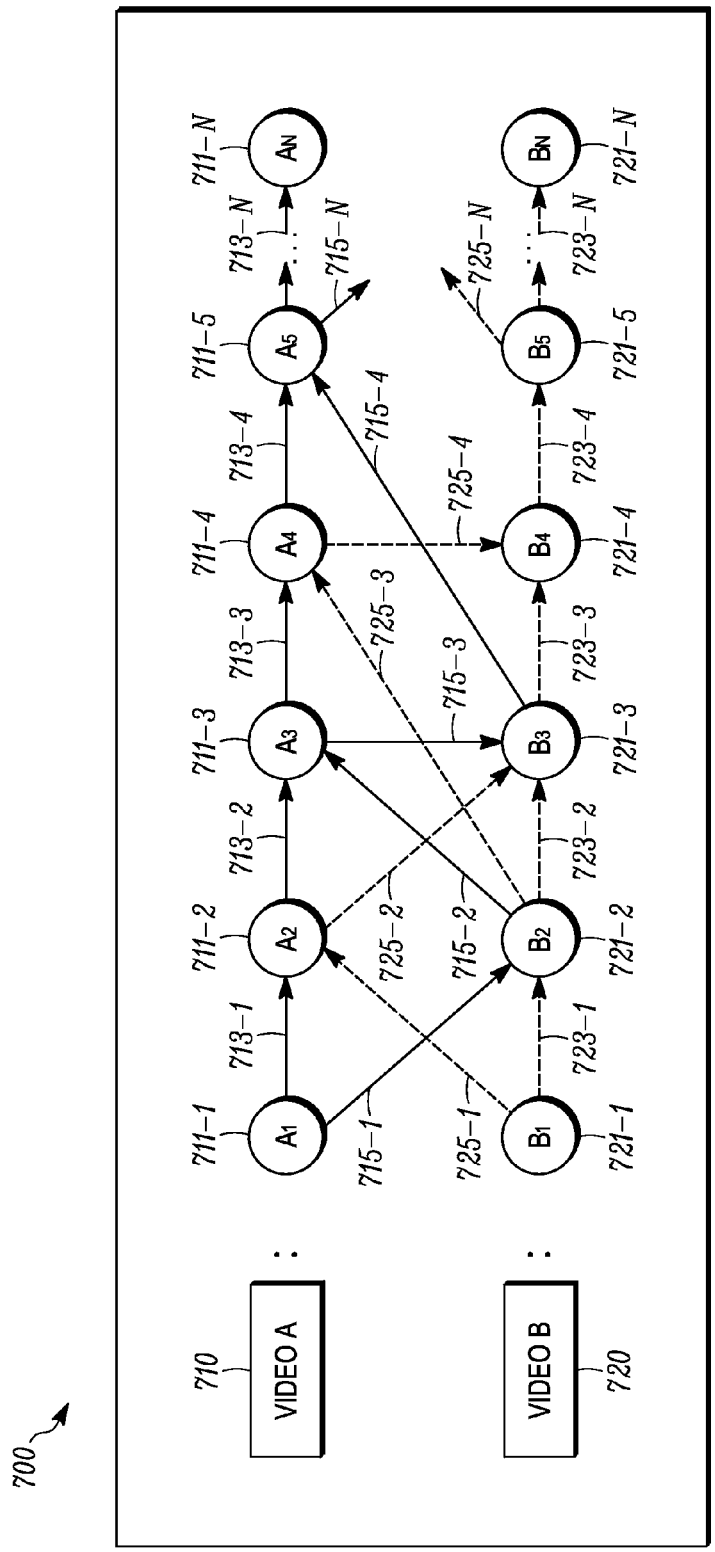
FIG. 7 is a block diagram of a sequential semantic representation according to one embodiment.

FIG. 7 illustrates an SSR 700 the can include reference to content items, or video clips, in video A 710 and video B 720 with multiple potential paths for generating multiple potential video sequences, according to various embodiments of the present disclosure. As shown, video A 710 can include various video clips or segments 711. Video B 720 can also include various video clips or segments 721. One potential resulting video sequence includes simply playing video A 710 straight through according to paths 713. Similarly, another resulting video sequence includes simply playing video 720 straight through according to paths 723. However, other potential resulting video sequences exist according to paths 725 and 715. In related embodiments, more potential resulting video sequences exist when a combination of paths 713, 715, 723, and 725 are followed. For example, one potential resulting video sequence can include beginning at video clip 711-1, following path 715-1 to video clip 721-2. From video clip 721-2, path 725-3 can be followed to video clip 711-4. From video clip 711-4 can then be followed through the remainder of paths 713 by continuing on a long path 713-4.

Figure 8:
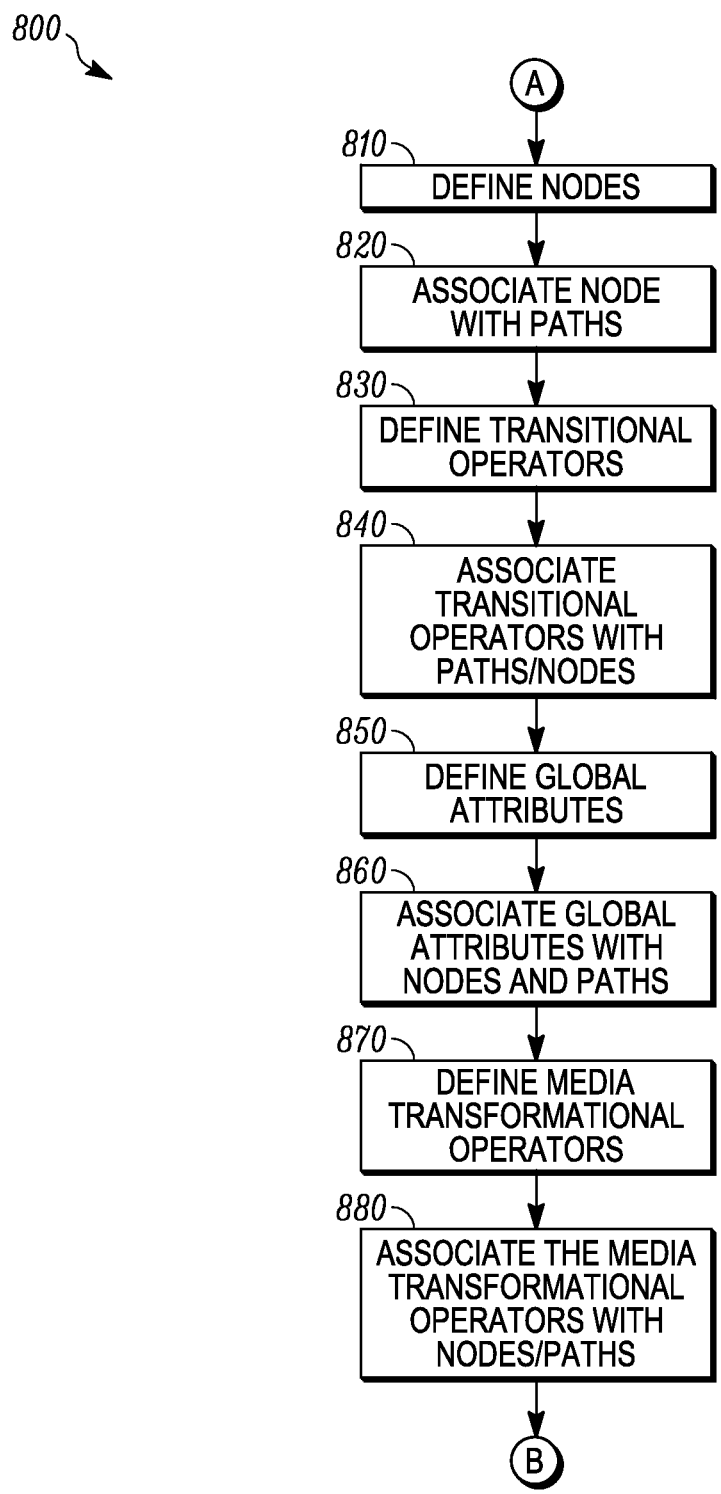
FIG. 8 is a flow chart of a method for defining sequential semantic representations according to one embodiment.

FIG. 8 is a flowchart of a method 800 for defining SSRs according to various embodiments of the present disclosure. Such methods can begin by receiving user input at A to initiate or invoke a sequence editor 125. Sequence editor 125 can define a plurality of nodes in action 810. Defining a plurality of nodes can include associating each node with a set of weighted criteria. The weighted criteria can include a set of individual weighted criteria. Each individual weighted criterion can include a tuple or other ordered list of elements of values. Such values can include attribute name, an attribute value, and a weighting value, according to various embodiments discussed herein.

Defining the plurality of nodes can include associating each node with another node using pairwise connections using a plurality of paths in action 820. Each path can define a relationship between the two nodes it connects. For example, in some embodiments, the path between two nodes can define a temporal relationship between the content items that match the two nodes. Specifically, a path between two nodes can define the order in which the matching content items will be shown in the final content item sequence.

In action 830, the sequence editor 125 can define and/or retrieve a collection of previously defined transitional operators. The transitional operators can then be associated with one or more paths in action 840. Such transitional operators can impose criteria for visual effects when transitioning between content items that match two consecutive nodes connected by a particular path. For example, a transitional operator can impose a requirement that the transition associated with a path between two content items include a fade from color into black and white, and then back into color. In other embodiments, the transitional operators can include further constraints on the nodes connected by the paths with which the transitional operators are associated.

In action 850, the sequence editor 125, in response to user input, can define global attributes. Global attributes can include a set of absolute or conditional criteria universally or selectively applicable to the various components of the SSR. Accordingly, in action 860, sequence editor 125 can associate one or more global attributes with various nodes in paths. For example, global attributes according to various embodiments of the present disclosure can include criteria and/or constraints regarding the total length of a sequence based on the SSR. More specifically, the global attributes can include specific proportional or absolute time or duration restrictions on a node by node level, a path by path level, and on the overall length of the resulting sequence based on the SSR. In other embodiments, the global attributes can define one or more media data stores the can be accessed in order to match the criteria of the nodes and paths of the SSR.

In action 870, the sequence editor 125 defines one or more media transformational operators. Such media transformational operators can include instructions for augmenting content items which are determined to match various nodes in paths of the SSR. For example a media transformational operator include instructions for removing the sound from a video clip is determined to match with the particular note in the SSR and replace it with another soundtrack. For example, the audio content of a particular video clip may be in one language. A media transformational operator can be defined to remove the original audio language in the first language and replace it with alternative audio in another language. In action 880, sequence editor 125 can associate the media transformational operators with one or more nodes or paths.

Once all the nodes, paths, and the associated transitional operators global attributes and media transformational operators are determined, the sequence editor 125 can save the resulting SSR to one or more computer readable storage devices, such as media data store 141. In some embodiments, the resulting SSR can be associated with a name, an identifier, or a descriptor when stored.

Figure 9:
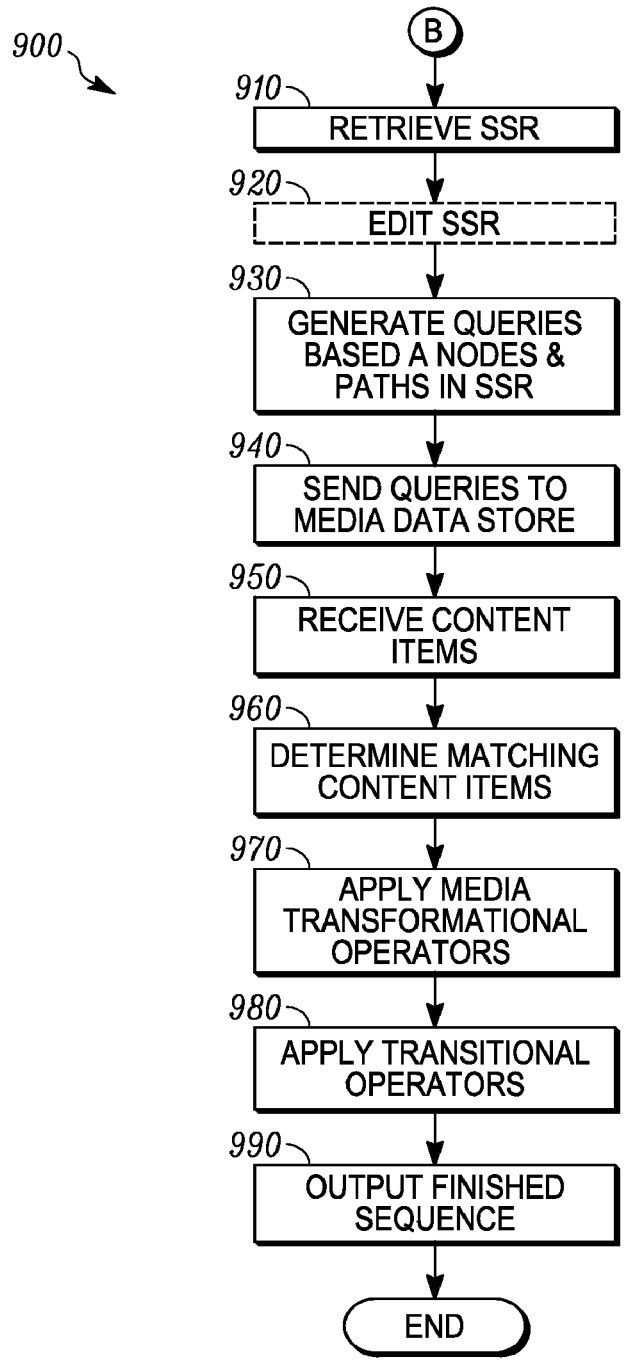
FIG. 9 is a flow chart of a method for generating content item sequences based sequential semantic representations according to one embodiment.

FIG. 9 is a flowchart of a method 900 for generating a media sequence based on existing content items. Method 900 can begin at action 910 in which a sequence engine 115, or other computer system, can retrieve a stored SSR from a data store, such as media data store 141. In such embodiments, the SSR can be retrieved based on a name, identifier, or descriptor associated with the SSR in the data store. In some embodiments, a visual representation of the SSR can be displayed to a user on a display device, such as a computer monitor or touch screen. Such visual representations can include a visual graph which includes a number of icons representing nodes and paths of the SSR.

In some embodiments, the sequence engine 115 can optionally edit the SSR according to predetermined settings or in response to user input received through the associated sequence editor 125 in action 920. Such an embodiment is advantageous in that it allows the user to modify previously defined SSRs, thereby eliminating the need to start from scratch when defining an SSR. Such embodiments are also advantageous in that they allow a user to iteratively fine tune the resulting media sequence based on changes to the various sets of weighted criteria. Changing the waiting criteria can include altering the attribute names, attribute values, or weighting values.

Once the user satisfied with an iteration of an SSR, the sequence engine 115 can generate a number of queries based on the SSR in action 930. In particular, the sequence engine 115 can generate queries that incorporate various weighted criteria of the paths and nodes. In some embodiments, generating the queries can include generating a number of matching functions based on the various sets of weighted criteria of the paths and nodes. In other embodiments, generating queries can include translating from a namespace or naming convention native to the SSR to one or more name spaces or naming conventions associated with one or more media data stores.

In action 940, the sequence engine 115 can send the generated queries to one or more media data stores. In action 950, the sequence engine 115 can receive potentially matching content items in response to the generated queries. In such embodiments, not all of the matching content items received from the media data store will match the nodes, paths, and associated transitional operators appropriately. Accordingly, sequence engine 115 can analyze the received content items in order to determine the best matches for the SSR in action 960. Determining matching content item can include analyzing the potentially matching content items returned from the media data store. Such analysis can include generating one or more matching functions based on one or more weighted criteria associated with one or more nodes, paths, and/or transitional operators of the SSR. The matching functions can be used to generate a matching confidence score based on the associated characteristics and/or descriptors of the potentially matching content items. In some embodiments, matching content items are determined by selecting the content items with the highest matching confidence score. In related embodiments, the matching content items are determined by selecting the content of the highest matching confidence score and comply with any global attributes of the SSR. In some embodiments, the best matching content items will be a partial match to the particular node and associated weighted criteria in view of other constraints imposed by global attributes or transitional operators.

Sequence engine 115 can apply the media transformational operators to the matched some or all of content items, in action 970. In action 980, the sequence engine 115 can then apply any transitional operators that include a transitional effect to generate transitional frames, sections, or segments between matching content items. In action 990, the resulting media sequence can be output. In some embodiments, outputting the finished sequence can include storing the sequence in one or more data stores. In other embodiments, outputting the finish sequence can include displaying the sequence on a display device to one or more users.

Figure 10:
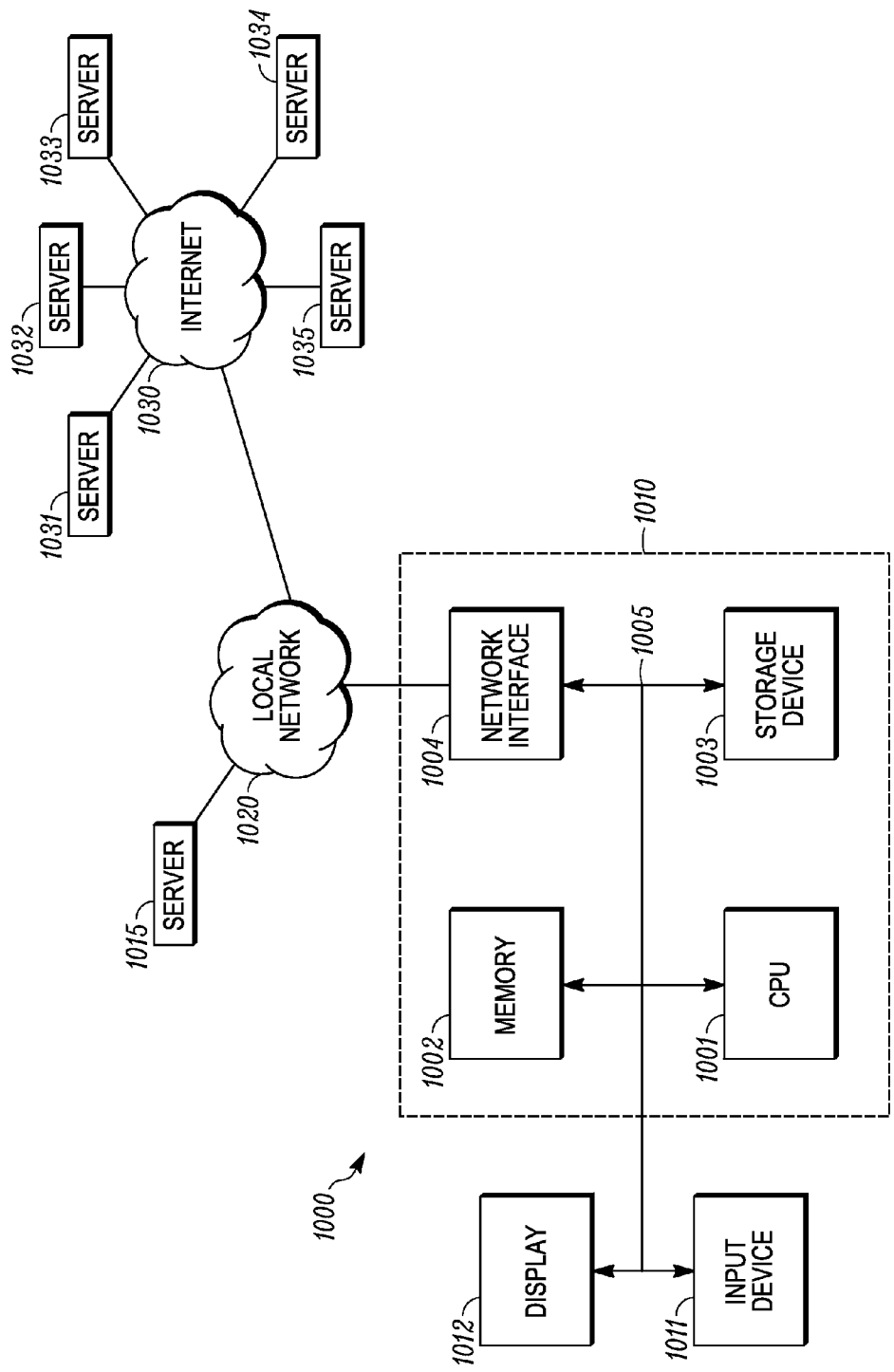
FIG. 10 is a block diagram of a computer system that can be used to implement various embodiments of the present disclosure.

FIG. 10 illustrates an example computer system and networks that may be used to implement one embodiment of the present disclosure. Computer system 1010 includes a bus 1005 or other communication mechanism for communicating information, and a processor 1001 coupled with bus 1005 for processing information. Computer system 1010 also includes a memory 1002 coupled to bus 1005 for storing information and instructions to be executed by processor 1001, including instructions for performing the techniques described above. This memory may also be used for storing temporary variables or other intermediate information during execution of instructions to be executed by processor 1001. Possible implementations of this memory may be, but are not limited to, random access memory (RAM), read only memory (ROM), or both. A storage device 1003 is also provided for storing information and instructions. The information instructions can be in the form of computer readable code stored on the storage device, accessible and executable by processor to implement various techniques and methods of the present disclosure. Common forms of storage devices include non-transient, non-volatile computer readable media, for example, a hard drive, a magnetic disk, an optical disk, a CD, a DVD, a flash memory, a USB memory card, or any other medium from which a computer can read.

Computer system 1010 may be coupled via the same or different information bus, such as bus 1005, to a display 1012, such as a cathode ray tube (CRT), liquid crystal display (LCD), or projector for displaying information, such as a graphical user interface associated with or generated by the sequence editor 125 or sequence engine 115, the resulting sequence based on an SSR. An input device 1011 such as a keyboard and/or mouse is coupled to a bus for communicating information and command selections from the user to processor 1001. The combination of these components allows the user to communicate with the system.

Computer system 1010 also includes a network interface 1004 coupled with bus 1005. Network interface 1004 may provide two-way data communication between computer system 1010 and the local network 1020. The network interface can be a local area network (LAN) card to provide a data communication connection to a compatible LAN. Wireless links is also another example. In any such implementation, network interface 1004 sends and receives electrical, electromagnetic, or optical signals that carry digital data streams representing various types of information.

Computer system 1010 can send and receive information, including messages or other interface actions, through the network interface 1004 to an Intranet or the Internet 1030. In the Internet example, software components or services may reside on multiple different computer systems 1010 or servers 1031 across the network. Software components described above may be implemented on one or more servers. A server 1031 may transmit messages from one component, through Internet 1030, local network 1020, and network interface 1004 to a component or container on computer system 1010, for example. Software components of a composite application may be implemented on the same system as other components, or on a different machine than other software components. This process of sending and receiving information between software components or one or more containers may be applied to communication between computer system 1010 and any of the servers 1031 to 1035 in either direction. It may also be applied to communication between any two servers 1031 to 1035.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
    determining, by a computer system, a plurality of nodes in a semantic representation, wherein each node of the plurality of nodes comprises a corresponding set of criteria;
    determining, by the computer system, a plurality of paths among the plurality of nodes, wherein the plurality of paths define a relationship among the plurality of nodes;
    determining, by the computer system, a transitional operator associated with a path in the plurality of paths connecting a first node and a second node in the plurality of nodes, wherein the transitional operator defines an additional criterion for the first node and the second node; and
    retrieving, by the computer system, a plurality of content items that include characteristics that are determined to match the corresponding set of criteria for at least one node in the plurality of nodes, wherein a first content item in the plurality of content items for the first node and a second content item for the second node are retrieved based on the first content item having a first characteristic and the second content item having a second characteristic that satisfy the additional criterion of the transitional operator.

2. The method of claim 1, further comprising determining, by the computer system, a set of global attributes applicable to multiple nodes in the plurality of nodes.

3. The method of claim 2, wherein the set of global attributes comprises a plurality of duration definitions for the multiple nodes in the plurality of nodes.

4. The method of claim 1, wherein a third node in the plurality of nodes comprises a media transformational operator.

5. The method of claim 4, wherein the media transformational operator defines a content item augmentation process to augment a characteristic of a third content item that is determined to match the corresponding set of criteria for the third node.

6. The method of claim 1, wherein the transitional operator comprises a media transformational operator that defines a content item augmentation process to augment a transition from the first node to the second node.

7. The method of claim 1, wherein each corresponding set of criteria comprises a corresponding set of weighting values used to determine the plurality of content items.

8. The method of claim 7, further comprising receiving, by the computer system, user input to change a first corresponding weighting value of a first criterion of a third node in the plurality of nodes, and, in accordance therewith, retrieving an updated content item to replace a previously retrieved content item that included attributes that was previously determined to match the first criterion of the third node.

9. A non-transitory computer-readable storage medium containing instructions that, when executed, control a processor of a computer system to be configured for:
    determining a plurality of nodes in a semantic representation, wherein each node of the plurality of nodes comprises a corresponding set of criteria;
    determining a plurality of paths among the plurality of nodes, wherein the plurality of paths define a relationship among the plurality of nodes;
    determining a transitional operator associated with a path in the plurality of paths connecting a first node and a second node in the plurality of nodes, wherein the transitional operator defines an additional criterion for the first node and the second node; and
    retrieving a plurality of content items that include characteristics that are determined to match the corresponding set of criteria for at least one node in the plurality of nodes, wherein a first content item in the plurality of content items for the first node and a second content item for the second node are retrieved based on the first content item having a first characteristic and the second content item having a second characteristic that satisfy the additional criterion of the transitional operator.

10. The non-transitory computer-readable storage medium of claim 9, wherein the instructions, when executed, further control the processor to be configured for:
    determining a set of global attributes applicable to multiple nodes in the plurality of nodes.

11. The non-transitory computer-readable storage medium of claim 10, wherein the set of global attributes comprises a plurality of duration definitions for the multiple nodes in the plurality of nodes.

12. The non-transitory computer-readable storage medium of claim 9, wherein a third node in the plurality of nodes comprises a media transformational operator.

13. The non-transitory computer-readable storage medium of claim 12, wherein the media transformational operator defines a content item augmentation process to augment characteristic of a third content item that is determined to match the corresponding set of criteria for the third node.

14. The non-transitory computer-readable storage medium of claim 9, wherein the transitional operator comprises a media transformational operator that defines a content item augmentation process to augment a transition from the first node to the second node.

15. The non-transitory computer-readable storage medium of claim 9, wherein each corresponding set of criteria comprises a corresponding set of weighting values used to determine the plurality of content items.

16. The non-transitory computer-readable storage medium of claim 15, wherein the instructions, when executed, further control the processor to be configured for:
    receiving user input to change a first corresponding weighting value of a first criterion of a third node in the plurality of nodes, and, in accordance therewith, retrieving an updated content item to replace a previously retrieved content item that included attributes that was previously determined to match the first criterion of the third node.

17. An apparatus comprising:
    one or more computer processors; and
    a non-transitory computer-readable storage medium containing instructions, that when executed, control the one or more computer processors to be configured for:
        determining a plurality of nodes in a semantic representation, wherein each node of the plurality of nodes comprises a corresponding set of criteria;

determining a plurality of paths among the plurality of nodes, wherein the plurality of paths define a relationship among the plurality of nodes;

determining a transitional operator associated with a path in the plurality of paths connecting a first node and a second node in the plurality of nodes, wherein the transitional operator defines an additional criterion for the first node and the second node; and retrieving a plurality of content items that include characteristics that are determined to match the corresponding set of criteria for at least one node in the plurality of nodes, wherein a first content item in the plurality of content items for the first node and a second content item for the second node are retrieved based on the first content item having a first characteristic and the second content item having a second characteristic that satisfy the additional criterion of the transitional operator.

18. The apparatus of claim 17, wherein the instructions, when executed, further control the one or more computer processors to be configured for:

determining a set of global criteria applicable to multiple nodes in the plurality of nodes.

19. The apparatus of claim 18, wherein the transitional operator comprises a media transformational operator that defines a content item augmentation process to augment a transition from the first node to the second node.

20. The apparatus of claim 17, wherein each corresponding set of criteria comprises a corresponding set of weighting values used to determine the plurality of content items.

* * * * *